(12) United States Patent
Okada et al.

(10) Patent No.: US 7,866,155 B2
(45) Date of Patent: Jan. 11, 2011

(54) MASTER CYLINDER AND METHOD OF MANUFACTURING THE SAME

(75) Inventors: Hiroki Okada, Yokohama (JP); Naganori Koshimizu, Kai (JP)

(73) Assignee: Hitachi, Ltd., Tokyo (JP)

( * ) Notice: Subject to any disclaimer, the term of this patent is extended or adjusted under 35 U.S.C. 154(b) by 489 days.

(21) Appl. No.: 12/078,151

(22) Filed: Mar. 27, 2008

(65) Prior Publication Data
US 2008/0264248 A1 Oct. 30, 2008

(30) Foreign Application Priority Data
Apr. 27, 2007 (JP) .............................. 2007-120279

(51) Int. Cl.
*B60T 11/16* (2006.01)
*F15B 7/08* (2006.01)

(52) U.S. Cl. ....................................................... 60/588

(58) Field of Classification Search ................... 60/562, 60/588
See application file for complete search history.

(56) References Cited

U.S. PATENT DOCUMENTS

| | | | | |
|---|---|---|---|---|
| 6,935,112 B2* | 8/2005 | Koshimizu et al. | ............ | 60/588 |
| 7,040,093 B2* | 5/2006 | Legret et al. | ................. | 60/588 |
| 7,104,059 B2* | 9/2006 | Tsubouchi et al. | ............ | 60/562 |
| 7,344,203 B2* | 3/2008 | Tsubouchi et al. | ............ | 60/592 |
| 7,386,979 B2* | 6/2008 | Tsubouchi | .................... | 60/588 |
| 7,401,468 B2* | 7/2008 | Mouri et al. | .................. | 60/588 |
| 7,694,516 B2* | 4/2010 | Mouri et al. | .................. | 60/588 |
| 2008/0087016 A1* | 4/2008 | Shepherd et al. | .............. | 60/562 |

FOREIGN PATENT DOCUMENTS

JP 2006-123879 5/2006

* cited by examiner

*Primary Examiner*—Thomas E Lazo
(74) *Attorney, Agent, or Firm*—Wenderoth, Lind & Ponack, L.L.P.

(57) ABSTRACT

An object of the present invention is to provide a master cylinder capable of controlling an increase in an intruding amount of a cup seal while relieving a stress concentration therein to thereby prevent the cup seal from being damaged. Provided is a master cylinder in which a piston is moved in slidable contact with an inner circumference of a cup seal held in a cylinder main body so as to pressurize a brake fluid in a pressure chamber formed of the piston and the cylinder main body, wherein an annular wall configured integrally with the cylinder main body is provided behind the cup seal. Further, a chamfered portion having a curved shape in a cross-section taken along a diameter direction of the cylinder main body is provided between the annular wall and a cylinder wall to which the piston is facing. One end of the chamfered portion is formed continuously so that a tangent thereto is in line with the annular wall, and the other end of the chamfered portion is formed to constitute a flexed portion in combination with the cylinder wall.

9 Claims, 7 Drawing Sheets

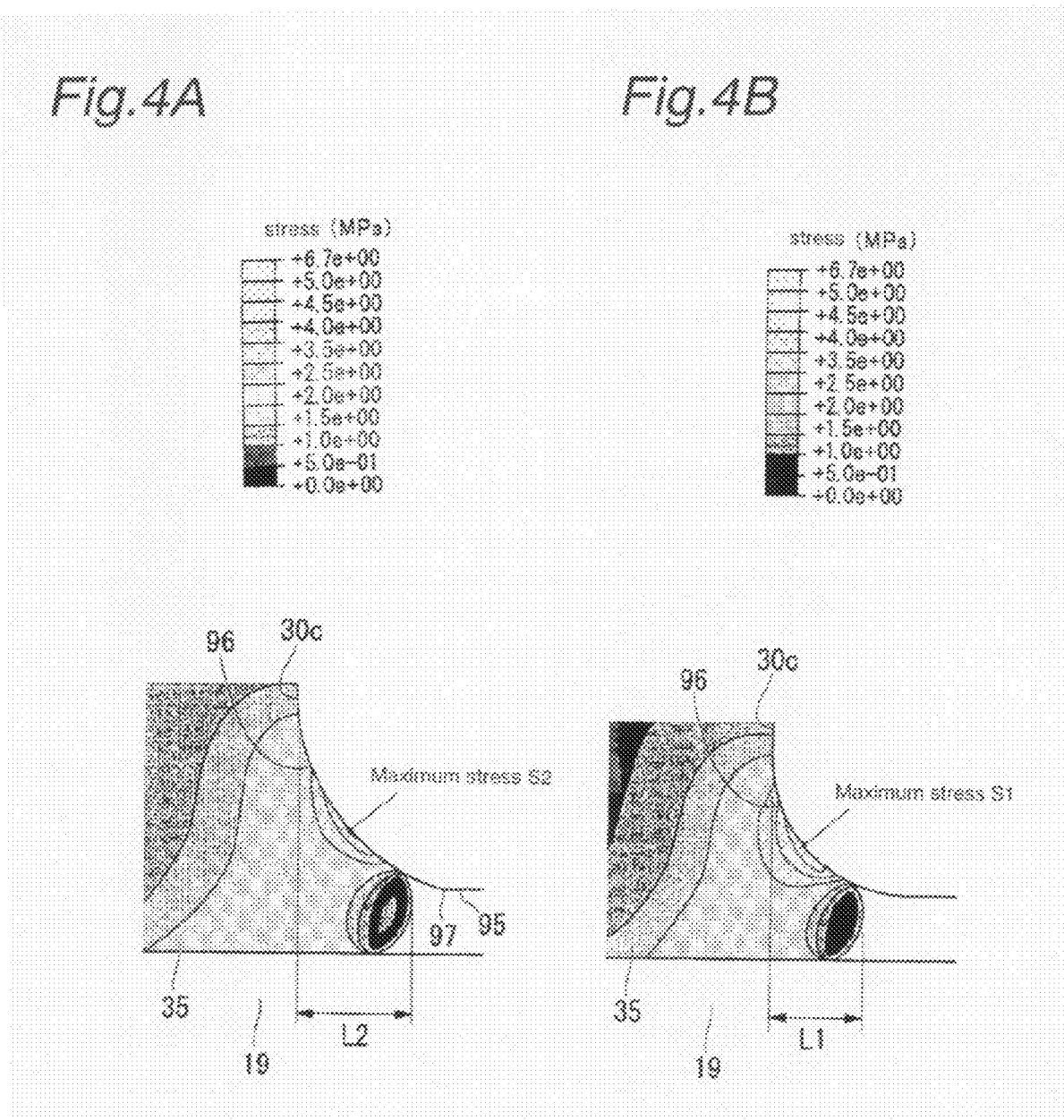

Radius of curvature of the arc

Radius of curvature of the arc

MASTER CYLINDER AND METHOD OF MANUFACTURING THE SAME

BACKGROUND OF THE INVENTION

The present invention relates to a master cylinder for supplying a brake fluid to a brake system of a vehicle and a method of manufacturing the master cylinder.

As a master cylinder for supplying a brake fluid to a brake system of a vehicle, for example, as described in Japanese Patent Publication No. 2006-123879, there is provided a constitution in which a piston is operatively provided on an inner circumference of a cup seal held in a seal groove of a cylinder main body so as to be slidable therein, and a brake fluid in a pressure chamber formed by the piston and the cylinder main body is pressurized by the sliding movement of the piston so as to be supplied to the brake system. This type of master cylinder has an annular wall 102 in a cylinder main body 100, which is a part of a seal groove and is located behind a cup seal 101, and a corner portion provided between the annular wall 102 and a cylinder wall 104 facing an outer circumference surface of a piston 103 is formed of a chamfered portion 105 having, for example, a circular arc shape in a cross-section along a diameter direction (i.e., a cross-section taken along a diameter direction passing through a center line) of the cylinder main body 100, as shown in FIG. 10. The chamfered portion 105 is formed such that tangents to both ends of the circular arc are in line with a wall surface of the annular wall 102 and a wall surface of the cylinder wall 104, respectively.

In the above-described master cylinder, when the piston 103 slides back in an arrowhead direction X shown in FIG. 10 while a high-level of hydraulic pressure being held in a pressure chamber, the cup seal 101 is likely to deform and intrude into a clearance between the piston 103 and the cylinder wall 104, wherein a stress concentration in a deformed portion 106 may be relieved by forming the chamfered portion 105. That is to say, if the chamfered portion 105 is not formed, the stress concentration in the deformed portion 106 could be so high as to damage the cup seal. In order to ensure the relief of the stress concentration, it was intended to increase a radius of curvature of the chamfered portion 105 into R2, which has been conventionally R1 as shown in FIG. 11. By this change, the maximum stress value S in the deformed portion 106 of the cup seal 101 was reduced as shown in FIG. 12A, which shows an increase in the radius from R1 to R2 has high effect on the relief of the stress concentration. However, the change involved a problem that, by increasing the radius of the chamfered portion 105 from R1 to R2, locations defining both ends of the circular arc of the chamfered portion 105 are shifted away from A1, B1 to A2, B2, respectively, resulting in a considerable increase in an intrusion L of the deformed portion 106, as shown in FIG. 12B, which is likely to causes more bite in the cup seal.

SUMMARY OF THE INVENTION

An objective of the present invention is to provide a master cylinder capable of controlling an increase in an amount of intrusion of a cup seal while relieving a stress concentration therein to thereby prevent a cup seal from being damaged, and a manufacturing method of the master cylinder.

The present invention provides a master cylinder in which a piston is moved in slidable contact with an inner circumference of a cup seal held in a cylinder main body so as to pressurize a brake fluid in a pressure chamber formed of the piston and the cylinder main body, the master cylinder comprising:

an annular wall constituted integrally with the cylinder main body behind the cup seal; and a chamfered portion provided between the annular wall and a cylinder wall to which the piston is facing, the chamfered portion having a curved shape in a cross-section taken along a diameter direction of the cylinder main body, wherein a tangent to one end of the chamfered portion is formed continuously so as to be in line with the annular wall, and the other end of the chamfered portion is formed so as to constitute a flexed portion in combination with the cylinder wall.

The chamfered portion may be formed into an elliptic arc shape in a cross-section taken along the diameter direction of the cylinder main body.

The chamfered portion may be formed into a circular arc shape in a cross-section taken along the diameter direction of the cylinder main body.

Preferably, a radius of curvature of the chamfered portion may be set three times as large as a clearance between the piston and the cylinder wall.

Further, the present invention provides a master cylinder in which a piston is moved in slidable contact with an inner circumference of a cup seal held in a cylinder main body so as to pressurize a brake fluid in a pressure chamber formed of the piston and the cylinder main body, the master cylinder comprising:

an annular wall constituted integrally with the cylinder main body behind the cup seal; and a chamfered portion provided between the annular wall and a cylinder wall to which the piston is facing, the chamfered portion having a circular arc shape, wherein a center of a circular arc of the chamfered portion is shifted toward the cylinder wall from a center of a circular arc defined in a case where tangents to both ends of the chamfered portion are in line with the annular wall and the cylinder wall.

Preferably, a shifting amount of the center of the circular arc of the chamfered portion may be smaller than a clearance between the piston and the cylinder wall.

Further, the present invention provides a method for manufacturing a master cylinder in which a piston is moved in slidable contact with an inner circumference of a cup seal held in a cylinder main body so as to pressurize a brake fluid in a pressure chamber formed of the piston and the cylinder main body, the method comprising the steps of:

forming a chamfered portion on an annular wall located behind the cup seal at an end portion thereof defined in an inner circumference side when machining a seal groove on the cylinder main body, into which the cup seal is to be fitted, wherein the chamfered portion is formed such that a shape of the chamfered portion is formed into a curved shape in a cross-section taken along a diameter direction of the cylinder main body so that a tangent to one end of the chamfered portion is in line with the annular wall; and then forming a flexed portion in the chamfered portion at an end portion thereof defined in the cylinder wall side by applying a smoothing processing onto the cylinder wall facing to the piston.

The chamfered portion may be formed into a circular arc shape in a cross-section taken along a diameter direction of the cylinder main body.

Preferably, a radius of curvature of the chamfered portion may be set approximately three times as large as a clearance between the piston and the cylinder wall.

BRIEF DESCRIPTION OF THE DRAWINGS

FIG. 4A and FIG. 4B respectively show stress distribution of a sealing structure according to a first embodiment of the present invention and to a conventional structure;

DETAILED DESCRIPTION OF THE PREFERRED EMBODIMENTS

An explanation will be given of a master cylinder and a method for manufacturing the master cylinder according to a first embodiment of the present invention in reference to FIG. 1 through FIG. 6.

Figure 1:
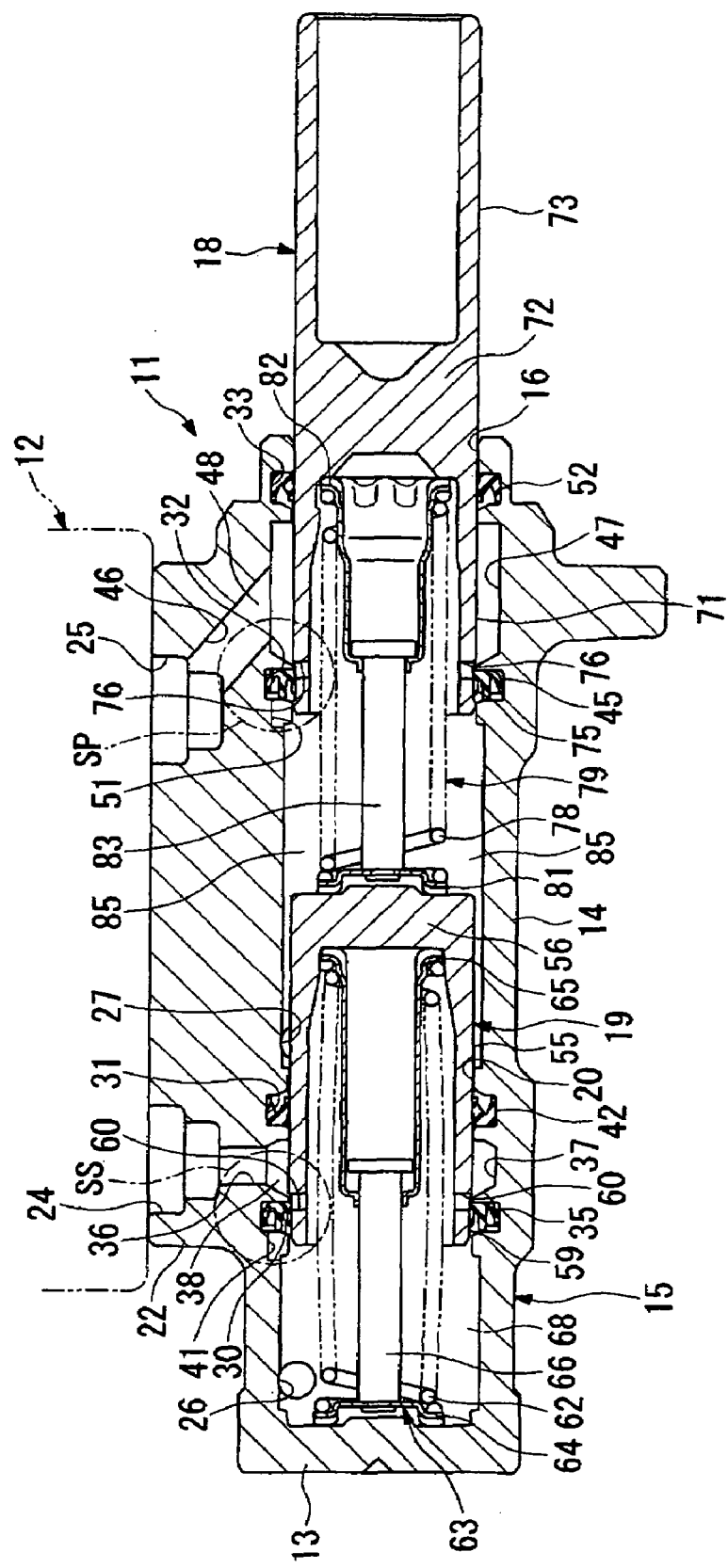
FIG. 1 is a sectional view illustrating a master cylinder according to a first embodiment of the present invention.

A notation 11 in FIG. 1 designates a master cylinder of the first embodiment for generating a brake hydraulic pressure with a force according to an operation amount of a brake pedal introduced via a brake booster; though not shown, wherein a reservoir 12 for charging and discharging a brake fluid is mounted to an upper portion of the master cylinder 11.

The master cylinder 11 is of a tandem type, which comprises a cylinder main body 15 formed by processing a single mass of material into a bottomed cylinder shape having a bottom portion 13 and a cylinder portion 14, said cylinder main body 15 being arranged in a vehicle along a lateral direction, a primary piston (piston) 18 slidably inserted into the cylinder main body 15 in an opening portion 16 side thereof, and a secondary piston (piston) 19 slidably inserted into the cylinder main body 15 in the bottom portion 13 side thereof with respect to the primary piston 18. It is to be noted that the primary piston 18 and the secondary piston 19 are guided by a slide bore portion 20 having an circular shape of section in a plane orthogonally intersecting with an axis line of the cylinder portion 14 of the cylinder main body 15 (hereinafter referred to as a cylinder axis).

The cylinder main body 15 is provided with a mounting pedestal 22 formed integrally therewith at a predetermined position in a circumferential direction of the cylinder portion 14 (hereinafter referred to as a cylinder circumferential direction) so as to extend outward in a diameter direction of the cylinder portion 14 (hereinafter referred to as a cylinder diameter direction), wherein the mounting pedestal 22 is provided with mounting holes 24 and 25 for mounting the reservoir 12 in the same position in the cylinder circumferential direction from each other with a certain space placed therebetween in the cylinder axis direction.

The cylinder main body 15 is provided in the mounting pedestal 22 side of the cylinder portion 14 with a secondary discharge passage 26 and a primary discharge passage 27 for connecting with brake pipings, though not shown, for supplying a brake fluid to a brake system, though not shown. It is to be noted that the secondary discharge passage 26 and the primary discharge passage 27 are formed in the same position in the cylinder circumferential direction from each other with a certain space placed therebetween in the cylinder axis direction.

The slide bore portion 20 of the cylinder main body 15 is provided with plural seal grooves while shifting respective positions from each other in the cylinder axis direction, in particular, as a seal groove 30, a seal groove 31, a seal groove 32 and a seal groove 33 at four places arranged in this order from the bottom portion 13. Each of these seal grooves 30, 31, 32, and 33 has an annular shape in the cylinder circumferential direction so as to be recessed outward in the cylinder diameter direction.

The seal groove 30 located in the most bottom portion 13 side is formed adjacently to the mounting hole 24 defined in the bottom portion 13 side, to which an annular cup seal 35 is fitted.

The cylinder main body 15 is provided in the opening portion 16 side thereof with respect to the seal groove 30 with an annular opening groove 37 recessed outward in the cylinder diameter direction from the slide bore portion 20 of the cylinder portion 14 in order to open a communication hole 36 drilled from the mounting hole 24 defined in the bottom portion 13 side into the cylinder portion 14. Herein, the opening groove 37 and the communication hole 36 connect the cylinder main body 15 and the reservoir 12 so as to be capable of communicating with each other and at the same time, constitute mainly a secondary supply passage 38 constantly communicating with the reservoir 12.

The slide bore portion 20 of the cylinder main body 15 is provided in the mounting pedestal 22 side thereof in the cylinder circumferential direction with a communication groove 41 opening into the seal groove 30 and slightly extending toward the bottom portion 13 side straightly in the cylinder axis direction from the seal groove 30 so as to be recessed outward in the cylinder diameter direction. This communication groove 41 provides a communication between the secondary discharge passage 26 formed between the bottom portion 13 and the seal groove 30 at a location adjacent to the bottom portion 13 and the seal groove 30.

The cylinder main body 15 is provided with the above-mentioned seal groove 31 in an opposite side of the above-described opening groove 37 with respect to the seal groove 30, or in the opening portion 16 side thereof, in a cylinder axis direction, into which seal groove 31 an annular partition seal 42 is fitted.

The cylinder main body 15 is further provided with the above-mentioned seal groove 32 in the opening portion 16 side thereof with respect to the seal groove 31 at a location adjacent to the mounting hole 25 defined in the opening portion 16 side, into which seal groove 32 an annular cup seal 45 is fitted.

The cylinder main body 15 is provided in the opening portion 16 side thereof with respect to the seal groove 32 with an annular opening groove 47 recessed outward in the cylinder diameter direction from the slide bore portion 20 of the cylinder portion 14 in order to open a communication hole 46 drilled from the mounting hole 25 defined in the opening portion 16 side into the cylinder portion 14. Herein, the opening groove 47 and the communication hole 46 connect the cylinder main body 15 and the reservoir 12 so as to be capable of communicating with each other and at the same time, constitute mainly a primary supply passage 48 constantly communicating with the reservoir 12.

The slide bore portion 20 of the cylinder main body 15 is provided in the bottom portion 13 side of the seal groove 32 thereof and in the mounting pedestal 22 side in the cylinder circumferential direction with a communication groove 51 opening into the seal groove 32 and slightly extending toward the bottom portion 13 side straightly in the cylinder axis direction from the seal groove 32 so as to be recessed outward in the cylinder diameter direction. This communication groove 51 provides a communication between the primary discharge passage 27 formed at a location adjacent to the seal groove 31 and the seal groove 32.

The cylinder main body 15 is further provided with the seal groove 33 in an opposite side of the above-described opening groove 47 with respect to the seal groove 32, or in the opening portion 16 side thereof, into which seal groove 33 an annular partition seal 52 is fitted.

The secondary piston 19, which is to be fitted to a bore of the cylinder main body 15 at the bottom portion 13 side thereof, is formed of a bottomed cylinder shape having a cylinder portion 55 and a bottom portion 56 formed on one side in the axial line direction of the cylinder portion 55, and is slidably fitted into the slide bore portion 20 of the cylinder main body 15 with the cylinder portion 55 arranged in the bottomed portion 13 side of the cylinder main body 15. Further, an outer circumference of the cylinder portion 55 is provided at an end portion thereof defined in an opposite side of the bottom portion 56 with an annular step portion 59 having a diameter slightly smaller than other portion, wherein a plurality of ports 60 is formed in the step portion 59 at the bottom 56 side thereof extending radially therethrough in the cylinder diameter direction.

An interval regulator 63 including a secondary piston spring 62 is installed between the secondary piston 19 and the bottom portion 13 of the cylinder main body 15 so as to define an interval therebetween during an initial state with no input applied from a side of a brake pedal, though not shown (i.e., from right-hand side in FIG. 1). The interval regulator 63 comprises a spring retainer 64 configured to contact with the bottom portion 13 of the cylinder main body 15, a spring retainer 65 configured to contact with the bottom portion 56 of the secondary piston 19, and a shaft member 66 fixed in one end to the spring retainer 64 and adapted to support the spring retainer 65 to be slidable within a predetermined range, wherein the secondary piston spring 62 is installed between the spring retainers 64, 65 arranged at both ends thereof.

A space surrounded by the bottom portion 13 of the cylinder main body 15, the cylinder portion 14 defined in the bottom portion 13 side thereof, and the secondary piston 19 forms a secondary hydraulic chamber (pressure chamber) 68 for supplying a hydraulic pressure to the secondary discharge passage 26. The secondary hydraulic chamber 68 communicates with the secondary supply passage 38 when the secondary piston 19 is located in such a position as the port 60 opens to the opening groove 37. Meanwhile, the cup seal 35 installed in the seal groove 30 in the cylinder main body 15 defined in the bottom portion 13 side thereof is arranged such that an inner circumference thereof comes in slidable contact with an outer circumference of the secondary piston 19. When the secondary piston 19 is in such a position as the port 60 is located in the bottom portion 13 side with respect to the cup seal 35, the cup seal 35 is capable of sealingly separating the secondary supply passage 38 from the secondary hydraulic chamber 68, that is to say, capable of blocking off a communication between the secondary hydraulic chamber 68 and the secondary supply passage 38 and thus the reservoir 12. In this condition, the secondary piston 19 is slidably moved in the slide bore portion 20 of the cylinder main body 15 while being in contact with the inner circumferences of the cup seal 35 and the partitioning seal 42 each held by the cylinder main body 15 so as to pressurize a brake fluid in the secondary hydraulic chamber 68, to thereby supply the brake fluid from the secondary discharge passage 26 to a brake system.

The primary piston 18, which is to be fitted to a bore of the cylinder main body 15 at the opening portion 16 thereof, is formed of a shape having a first cylinder portion 71, a bottom portion 72 formed on one side of the first cylinder portion 71 in an axis direction, and a second cylinder portion 73 formed in an opposite side of the bottom portion 72 with respect to the first cylinder portion 71. The primary piston 18 is slidably inserted into the bore of the cylinder main body 15 with the first cylinder portion 71 arranged in the secondary piston 19 side in the cylinder main body 15. Herein, an output shaft of a brake booster, though not shown, is inserted into an inside of the second cylinder portion 73 so as to depress the bottom portion 72.

An outer circumference of the first cylinder portion 71 is provided at an end portion thereof defined in an opposite side of the bottom portion 72 with an annular recessed portion 75 having a diameter slightly smaller than other portion. Further, a plurality of ports 76 is formed in the recessed portion 75 of the first cylinder portion 71 at the bottom portion 72 side thereof extending radially therethrough in the cylinder diameter direction.

An interval regulator 79 including a primary piston spring 78 is installed between the secondary piston 19 and the primary piston 18 so as to define an interval therebetween during an initial state with no input applied from a side of the brake pedal, though not shown (i.e., from right-hand side in FIG. 1). The interval regulator 79 comprises a spring retainer 81 configured to contact with the bottom portion 56 of the secondary piston 19, a spring retainer 82 configured to contact with the bottom portion 72 of the primary piston 18, and a shaft member 83 fixed in one end to the spring retainer 82 and adapted to support the spring retainer 81 to be slidable within a predetermined range. The primary piston spring 78 is installed between the spring retainers 81, 82 arranged at both ends thereof.

A space surrounded by the cylinder portion 14 of the cylinder main body 15 defined in the opening portion 16 side thereof, the primary piston 18, and the secondary piston 19 forms a primary hydraulic chamber (pressure chamber) 85 for supplying a hydraulic pressure to the primary discharge passage 27. The primary hydraulic chamber 85 communicates with the primary supply passage 48 when the primary piston 18 is located in such a position as the port 76 opens to the opening groove 47. Meanwhile, the cup seal 45 installed in the seal groove 32 in the cylinder main body 15 is arranged such that an inner circumference thereof comes in slidable contact with an outer circumference of the primary piston 18. When the primary piston 18 is in such a position as the port 76 is located in the bottom portion 13 side with respect to the cup seal 45, the cup seal 45 is capable of sealingly separating the primary supply passage 48 from the primary hydraulic chamber 85, that is to say, capable of blocking off a communication between the primary hydraulic chamber 85 and the primary supply passage 48 and thus the reservoir 12. In this condition, the primary piston 18 is slidably moved in the slide bore portion 20 of the cylinder main body 15 while being in contact with the inner circumferences of the cup seal 45 and the partitioning seal 52 each held by the cylinder main body 15 so as to pressurize a brake fluid in the primary hydraulic chamber 85, to thereby supply the brake fluid from the primary discharge passage 27 to the brake system.

Herein, since a secondary side sealing structure SS comprising a portion adjacent to the seal groove 30 of the cylinder main body 15, the cup seal 35, and a portion of the secondary piston 19 in slidable contact with the cup seal 35 has a similar structure with a primary side sealing structure SP comprising a portion adjacent to the seal groove 32 of the cylinder main body 15, the cup seal 45, and a portion of the primary piston 18 in slidable contact with the cup seal 45, an explanation will be given employing the secondary side sealing structure SS as an example.

Figure 2:
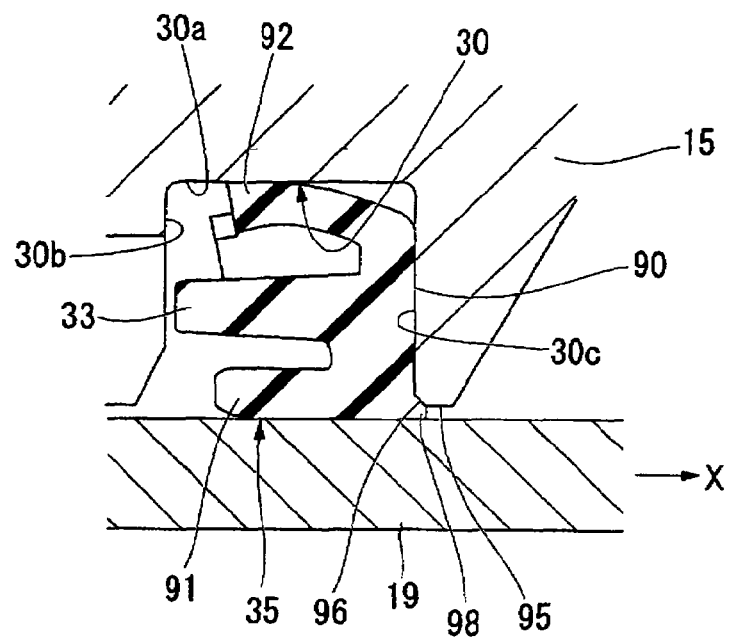
FIG. 2 is an enlarged sectional view illustrating a sealing structure in the master cylinder according to the first embodiment of the present invention.
Figure 3:
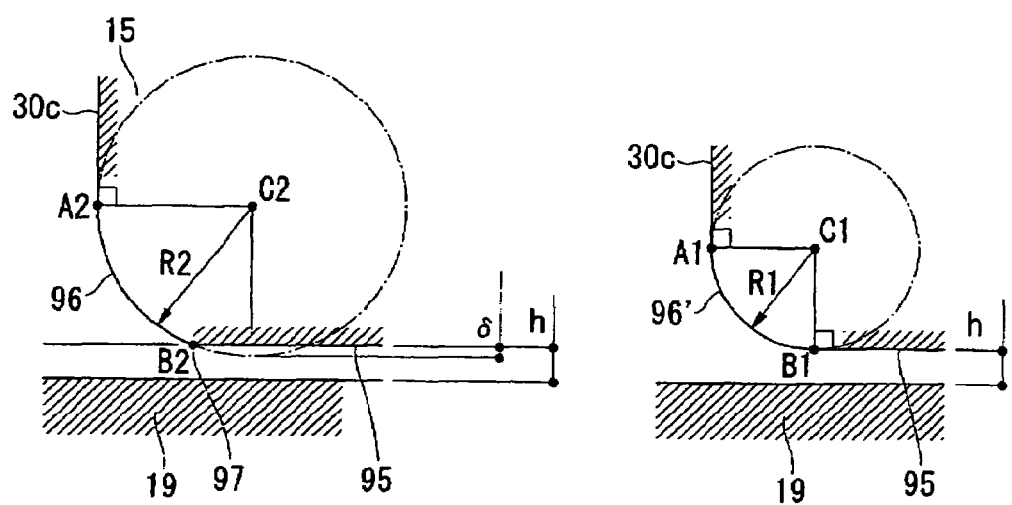
FIG. 3A and FIG. 3B are enlarged sectional views respectively illustrating a portion adjacent to a chamfered portion in the master cylinder according to a first embodiment of the present invention and to a conventional structure.

The cup seal 35, as shown in a half side sectional view in FIG. 2, comprises an annular base portion 90; an inner circumference lip portion 91 of annular shape extending from an inner circumference side of the base portion 90 in one side approximately along an axis direction of the base portion 90; an outer circumference lip portion 92 of annular shape extending from an outer circumference side of the base portion 90 to the same one side with the inner circumference lip portion 91; and a middle extending portion 93 of annular shape extending from the base portion 90 at a location between the inner circumference lip portion 91 and the outer circumference lip portion 92 to the same one side therewith, so as to form an E-shaped section as a whole.

The cup seal 35 is to come into slidable contact with an outer circumference of the secondary piston 19 at the inner circumference lip portion 91, and to come into contact with a groove bottom portion 30a of the seal groove 30, which is integrally formed with the cylinder main body 15, at the outer circumference lip portion 92. Further, the cup seal 35 is to come into contacts with an annular wall 30c of the seal groove 30, which is integrally formed with the cylinder main body 15 behind the base portion 90, at the base portion 90.

Between the annular wall 30c and an inner cylinder wall 95 of the cylinder main body 15 in the diameter direction facing to the secondary piston 19, a chamfered portion 96 is provided having a curved section in a diameter direction of the cylinder main body 15 (a section in a cross-sectional plane taken along a diameter direction including a center line, hereinafter, referred to as the same).

The chamfered portion 96 is formed into a circular arc shape in a section taken in the diameter direction of the cylinder main body 15, as shown in FIG. 3A, and a center C2 of the arc shape of the chamfered portion 96 is shifted by an offset amount δ to the cylinder wall 95 side as compared to a case where tangents to both ends of the chamfered portion 96 are in line with the an annular wall 30c and the cylinder wall 95, respectively. Consequently, one end portion A2 of the chamfered portion 96 is formed consecutively so that a tangent thereof may be in line with a wall surface of the annular wall 30c, while the other end portion B2 of the chamfered portion 96 is formed so as to constitute a flexed portion 97 in combination with the cylinder wall 95.

It is to be noted that a radius R2 of the chamfered portion 96 is set to be approximately three times as large as a clearance h between the secondary piston 19 and the cylinder wall 95, that is, for example, when a clearance h between the secondary piston 19 and the cylinder wall 95 is 0.1 to 0.2, preferably a radius of curvature of the chamfered portion 96 is to be 0.3 to 0.6. Further, the above-described offset amount δ of the center C2 of the arc shape of the chamfered portion 96 is set to be smaller than a radius of curvature of the chamfered portion 96, and also smaller than the clearance h between the secondary piston 19 and the cylinder wall 95.

According to the master cylinder 11 of the above-described first embodiment, in the secondary side sealing structure SS, the center C2 of the arc shape of the chamfered portion 96 formed between the annular wall 30c behind the cup seal 35 and the cylinder wall 95 to which the secondary piston 19 is facing is shifted to the cylinder wall 95 side as compared to the case where the tangents to both ends of the chamfered portion 96 are in line with the annular wall 30c and the cylinder wall 95, respectively. Consequently, one end portion A2 of the chamfered portion 96 is formed continuously so that the tangent thereof may be in line with the wall surface of the annular wall 30c, while the other end portion B2 is formed so as to constitute the flexed portion 97 in combination with the cylinder wall 95. Herewith, a radius of curvature of the chamfered portion can be increased without accompanying an increase in an intruding volume of a deformed portion 98 of the cup seal 35, which could be deformed so as to intrude into a clearance between the secondary piston 19 and the cylinder wall 95 when the secondary piston 19 is sliding back in a return travel in a direction shown as an arrowhead X in FIG. 2. Therefore, since an increase in an intruding volume the cup seal 35 can be controlled while relieving a stress concentration therein, the cup seal 35 can be prevented from being damaged. Further, since the radius of curvature of the chamfered portion 96 can be increased, an outlet loss can be reduced with the aid of a flow of the fluid passing through the clearance when refilling the secondary hydraulic chamber 68 with a brake fluid from the reservoir 12 through a space of clearance h, thus to improve a refilling characteristic of the fluid.

Further, since the chamfered portion 96 is formed into a circular arc shape in a section taken along the diameter direction of the cylinder main body 15, the radius is kept to be constant so as to relieve the stress concentration additionally.

Further, since the radius of curvature R2 of the chamfered portion 96 is set to be approximately three times as large as the clearance h between the secondary piston 19 and the cylinder wall 95, an increase in the intruding volume of the cup seal 35 can be securely controlled while relieving the stress concentration therein.

Additionally, since the offset amount δ of the center C2 of the arc shape of the chamfered portion 96 is set to be smaller than the clearance h between the secondary piston 19 and the cylinder wall 95, a distance from the flexed portion 97 formed by the chamfered portion 96 and the cylinder wall 95 to the annular wall 30c can be secured. Therefore, the flexed portion 97 can be prevented from contacting with the cup seal 35 to generate the stress concentration therein.

Hereinafter, an explanation will be given more particularly in reference to FIG. 3A and FIG. 3B. FIG. 3B shows a sealing structure SS according to a conventional structure. In this structure, a radius of curvature of a chamfered portion 96' from a center C1 of an arc shape is R1, and the tangents to both ends A1 and B1 of the chamfered portion 96' are formed to be in line with the annular wall 30c and the cylinder wall 95, respectively. Herein, a radius of curvature R2 of the chamfered portion 96 in FIG. 3A is larger than the radius of curvature R1 of the chamfered portion 96' in FIG. 3B, while the clearance h in FIG. 3A and FIG. 3B is identical.

Figure 5A:
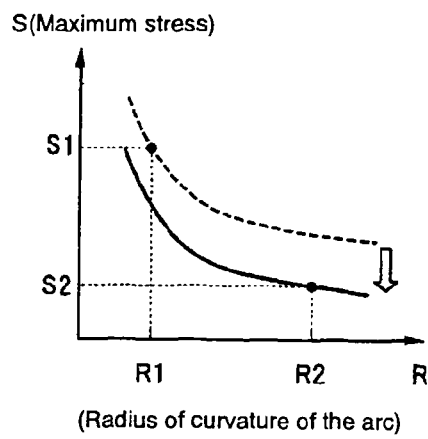
FIG. 5A and FIG. 5B are characteristic diagrams respectively illustrating a maximum stress value as a function of a radius of curvature of the chamfered portion and an intruding amount as a function of a radius of curvature of the chamfered portion of a sealing structure of a master cylinder according to the first embodiment of the present invention and to a conventional structure.
Figure 5B:
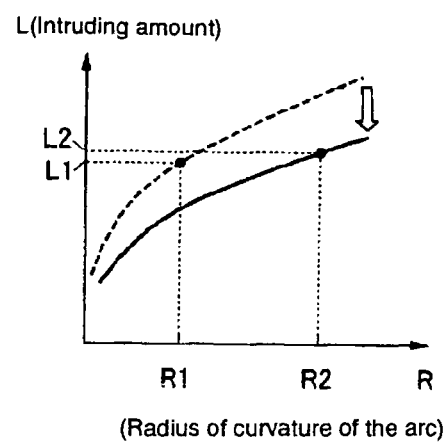

FIG. 4A and FIG. 4B show a stress distribution in the sealing structures according to a first embodiment of the present invention and a conventional structure, respectively. FIG. 5A and FIG. 5B are characteristic diagrams showing a maximum stress value as well as an intruding amount each as a function of a radius of curvature of the chamfered portion in the sealing structure of the first embodiment and in the conventional structure, respectively. In FIG. 5A and FIG. 5B, the solid lines indicate the characteristics of the sealing structure portion according to the first embodiment, while the broken lines indicate the characteristics of the sealing structure according to the conventional structure.

As clearly shown by the maximum stresses S2 and S1 in FIG. 4A and FIG. 4B and the maximum stresses S1 and S2 in FIG. 5A, the maximum stress S2 in the sealing structure according to the first embodiment is lower than the maximum stress S1 in the sealing structure according to the conventional structure.

Further, as clearly shown by the intruding amounts L2 and L1 in FIG. 4A and FIG. 4B and the intruding amounts L2 and L1 in FIG. 5B, the intruding amount L2 according to the first embodiment does not increase considerably from the intruding amount L1 according to the conventional structure. That is to say, it is comprehended that an increase in the intruding amount L2 according to the first embodiment from the intruding amount L1 according to the conventional structure can be controlled to be low.

Further, it can be comprehended that the maximum stress value of the first embodiment shown by the solid line in FIG. 5A is lower than that of the conventional structure shown by the broken line in FIG. 5A for the same radius of the chamfered portion 96 regardless of the absolute dimensions thereof. Further, it can be comprehended that the intruding amount of the first embodiment shown by the solid line in FIG. 5B is smaller than that of the conventional structure shown by the broken line in FIG. 5B for the same radius of the chamfered portion 95 regardless of the absolute dimensions thereof.

Figure 6A:
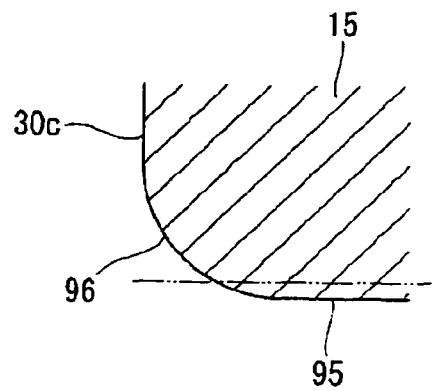
FIG. 6A and FIG. 6B are sectional views showing a forming process of the chamfered portion in the master cylinder according to the first embodiment of the present invention.
Figure 6B:
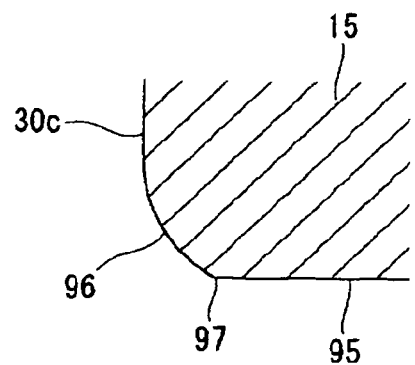

Herein, when the above-described chamfered portion 96 is to be formed, in a process for machining the seal groove 30 in the cylinder main body 15, into which the cup seal 35 is to be fitted, the chamfered portion 96 is formed in an end portion of the annular wall 30c defined in an inner circumference side thereof, as shown in FIG. 6A. During this process, the chamfered portion 96 having a curved shape in a cross-section taken along the diameter direction of the cylinder main body 15 is formed so that a tangent to one end portion of the chamfered portion 96 defined in the annular wall 30c side may be in line with a wall surface of the annular wall 30c. Then, the flexed portion 97 is formed as shown in FIG. 6B in an end portion of the chamfered portion 96 defined in the cylinder wall 95 side by applying a smoothing processing such as a machine processing, grinding processing and sanding processing onto the cylinder wall 95, as shown by a chain double-dashed line in FIG. 6A, so as to form it into a shape of cylinder surface. By taking the forming processes as described above, the chamfered portion 96 having a curved cross-section, which is provided between the annular wall 30c and the cylinder wall 95, can be formed easily into such a configuration in which one end of the chamfered portion is formed continuously so that a tangent thereof may be in line with the annular wall 30c, and the other end constitutes the flexed portion 97 in combination with the cylinder wall 95.

It is to be noted that although the foregoing explanation is directed to the secondary side sealing structure SS, the primary side sealing structure SP has a similar structure as described above, and thus the similar effect can be expected thereon.

An explanation will be given of a reservoir according to a second embodiment of the present invention mainly in reference to FIG. 7 focusing on a portion thereof different from that of the first embodiment. It is to be noted that portions thereof similar to those of the first embodiment are designated with the same notations and an explanation thereof will be omitted.

According to the second embodiment, a secondary side sealing structure SS and a primary side sealing structure SP differ from those of the first embodiment. It is to be noted that since the secondary side sealing structure SS and the primary side sealing structure SP according to the second embodiment also have similar structure with each other, an explanation will be given only to the secondary side sealing structure SS.

Figure 7:
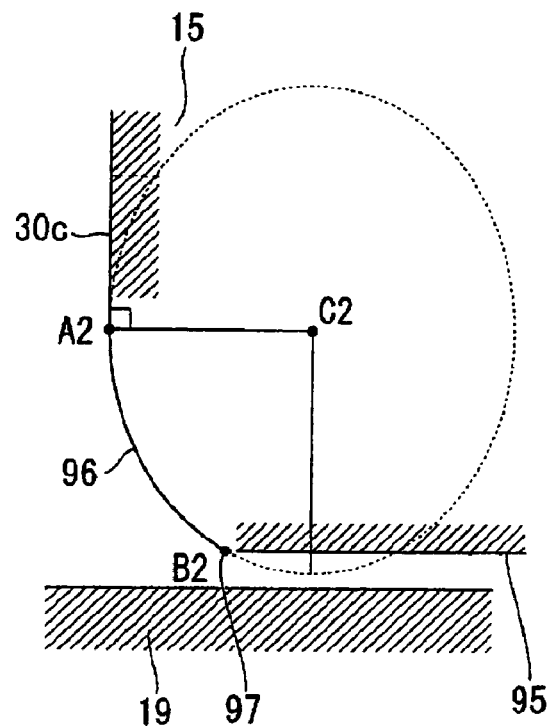
FIG. 7 is an enlarged sectional view illustrating a portion adjacent to a chamfered portion in a master cylinder according to a second embodiment of the present invention.

According to the second embodiment, the secondary side sealing structure SS is provided with a chamfered portion 96 having a curved shape in a cross-section taken along the diameter direction of the cylinder main body 15 between the annular wall 30c and the cylinder wall 95, as shown in FIG. 7, wherein the chamfered portion 96 has a shape of an elliptic arc, a long axis of which extends along a radius direction of the cylinder main body 15.

The chamfered portion 96 is configured such that one end portion A2 is formed continuously so that a tangent thereof may be in line with a wall surface of the annular wall 30c, while the other end portion B2 is formed so as to constitute a flexed portion 97 in combination with the cylinder wall 95.

According to the master cylinder 11 of the second embodiment described above, in the secondary side sealing structure SS, since the chamfered portion 96 having a shape of an elliptic arc and formed between the annular wall 30c behind the cup seal 35 and the cylinder wall 95 to which the secondary piston 19 is facing is configured such that one end portion A2 of the chamfered portion 96 is formed continuously so that a tangent thereof may be in line with a wall surface of the annular wall 30c, while the other end portion B2 of the chamfered portion 96 is formed so as to constitute a flexed portion 97 in combination with the cylinder wall 95, consequently a radius of curvature of the curve can be increased without accompanying an increase in an intruding volume of the deformed portion 98 of the cup seal 35. Therefore, since an increase in the intruding volume of the cup seal 35 can be controlled while relieving a stress concentration therein, the cup seal 35 can be prevented from being damaged.

Further, since the chamfered portion 96 is formed into a shape of an elliptic arc in a cross-section taken along the diameter direction of the cylinder main body 15, a radius of curvature of the curve can be increased without accompanying an increase in an intruding volume of the deformed portion 98 of the cup seal 35.

It is to be noted that, in this case, in addition to the secondary side sealing structure SS, the primary side sealing structure SP also has a similar structure, so that the similar effect can be expected on the latter.

Figure 8:
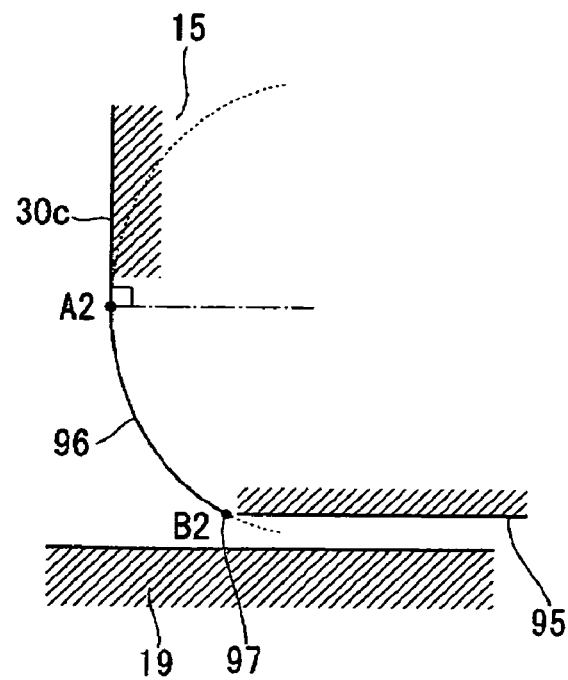
FIG. 8 is an enlarged sectional view illustrating a portion adjacent to a chamfered portion in a master cylinder according to a third embodiment of the present invention.

An explanation will be given of a master cylinder according to a third embodiment of the present invention mainly in reference to FIG. 8 focusing on a portion thereof different from that of the first embodiment. It is to be noted that portions thereof similar to those of the first embodiment are designated with the same notations and an explanation thereof will be omitted.

According to the third embodiment, a secondary side sealing structure SS and a primary side sealing structure SP differ from those according to the first embodiment. It is to be noted that since the secondary side sealing structure SS and the primary side sealing structure SP according to the third embodiment also have similar structure with each other, an explanation will be given only to the secondary side sealing structure SS.

According to the third embodiment, the secondary side sealing structure SS is provided with a chamfered portion 96 having a curved shape in a cross-section taken along the diameter direction of the cylinder main body 15 between the annular wall 30c and the cylinder wall 95, wherein the chamfered portion 96 has a shape of a parabola, and is connected to the annular wall 30c at a vertex of the parabola shape.

The chamfered portion 96 is configured such that one end portion A2 is formed continuously so that a tangent thereof may be in line with a wall surface of the annular wall 30c, while the other end portion B2 is formed so as to constitute a flexed portion 97 in combination with the cylinder wall 95.

According to the master cylinder 11 of the third embodiment described above, in the secondary side sealing structure SS, since the chamfered portion 96 having a shape of a parabola and formed between the annular wall 30c behind the cup seal 35 and the cylinder wall 95 to which the secondary piston 19 is facing is configured such that one end portion A2 of the chamfered portion 96 is formed continuously so that a tangent thereof may be in line with the annular wall 30c, while the other end portion B2 of the chamfered portion 96 is formed so as to constitute a flexed portion 97 in combination with the cylinder wall 95, consequently a radius of curvature of the curve can be increased without accompanying an increase in an intruding volume of the deformed portion 98 of the cup seal 35. Therefore, since an increase in the intruding volume of the cup seal 35 can be controlled while relieving a stress concentration therein, the cup seal 35 can be prevented from being damaged.

It is to be noted that, in this case, in addition to the secondary side sealing structure SS, the primary side sealing structure SP also has a similar structure, so that the similar effect can be expected on the latter.

Figure 9:
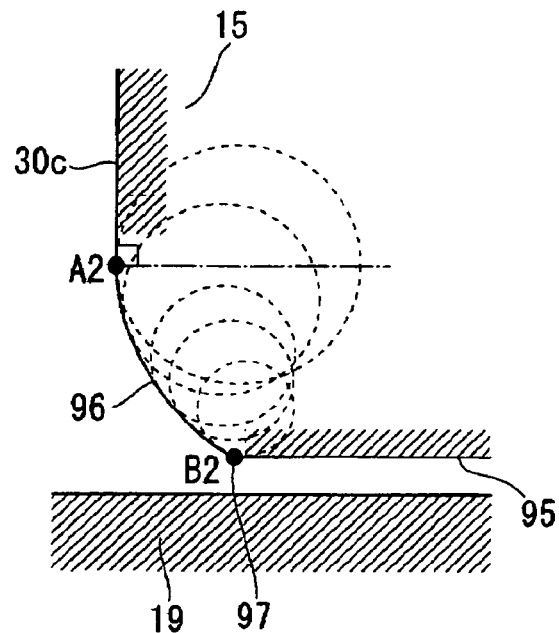
FIG. 9 is an enlarged sectional view illustrating a portion adjacent to a chamfered portion in a master cylinder according to a fourth embodiment of the present invention.
Figure 10:
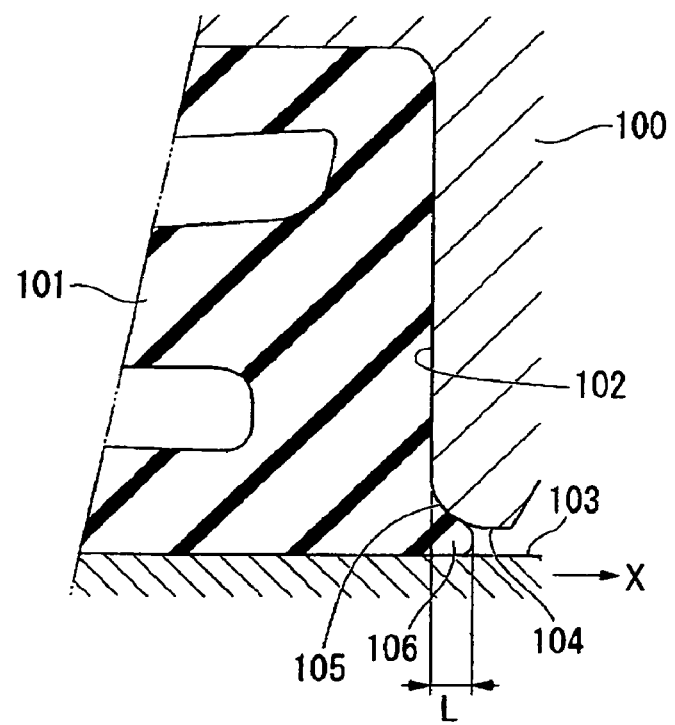
FIG. 10 is an enlarged sectional view illustrating a sealing structure in a master cylinder.
Figure 11:
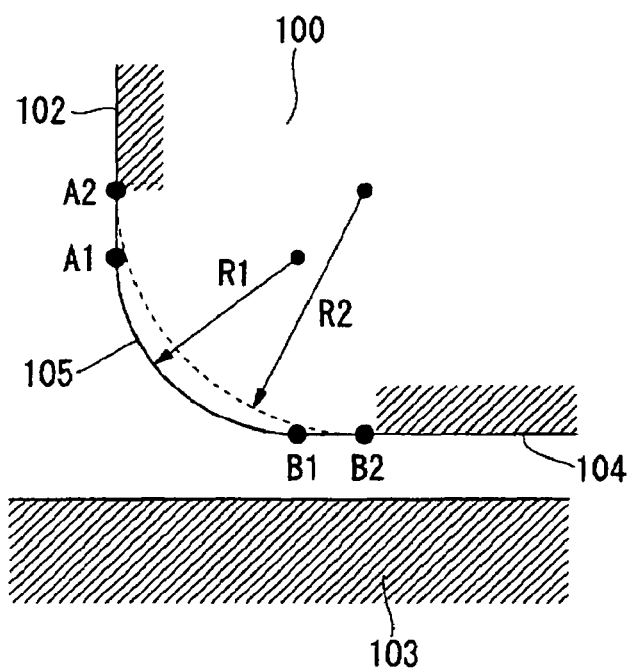
FIG. 11 is an enlarged sectional view illustrating a portion adjacent to a chamfered portion in a master cylinder.
Figure 12A:
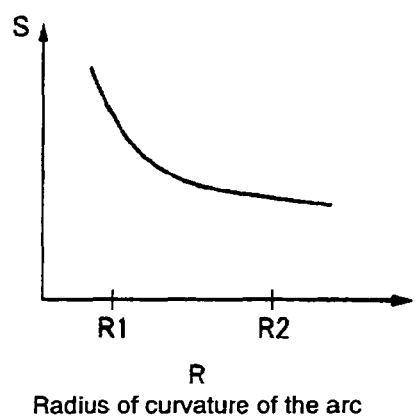
FIG. 12A and FIG. 12B are characteristic diagrams respectively illustrating a maximum stress value as a function of a radius of curvature of the chamfered portion and an intruding amount as a function of a radius of curvature of the chamfered portion of a master cylinder.
Figure 12B:
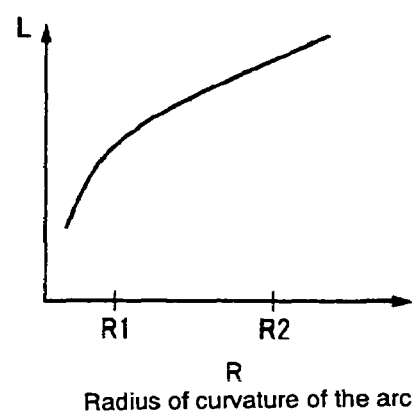

An explanation will be given of a master cylinder according to a fourth embodiment of the present invention mainly in reference to FIG. 9 focusing on a portion thereof different from that of the first embodiment. Further, portions thereof similar to those of the first embodiment are designated with the same notations and an explanation thereof will be omitted.

According to the fourth embodiment, a secondary side sealing structure SS and a primary side sealing structure SP differ from those according to the first embodiment. It is to be noted that since the secondary side sealing structure SS and the primary side sealing structure SP according to the fourth embodiment also have similar structure with each other, an explanation will be given only to the secondary side sealing structure SS.

According to the fourth embodiment, the secondary side sealing structure SS is provided with a chamfered portion 96 having a curved shape in a cross-section taken along the diameter direction of the cylinder main body 15 between the annular wall 30c and the cylinder wall 95, wherein the chamfered portion 96 has a curved shape with a radius of curvature changing gradually.

The chamfered portion 96 is configured such that one end portion A2 is formed continuously so that a tangent thereof may be in line with a wall surface of the annular wall 30c, while the other end portion B2 is formed so as to constitute a flexed portion 97 in combination with the cylinder wall 95, wherein a radius of curvature in the one end portion A2 side is larger while a radius of curvature in the other end portion B2 side is smaller.

According to the master cylinder 11 of the fourth embodiment described above, in the secondary side sealing structure SS, since the chamfered portion 96 having a curved shape and formed between the annular wall 30c behind the cup seal 35 and the cylinder wall 95 to which the secondary piston 19 is facing is configured such that one end portion A2 of the chamfered portion 96 is formed continuously so that a tangent thereof may be in line with the annular wall 30c, while the other end portion B2 of the chamfered portion 96 is formed so as to constitute a flexed portion 97 in combination with the cylinder wall 95, consequently a radius of curvature of the curve can be increased without accompanying an increase in an intruding volume of the deformed portion 98 of the cup seal 35. Therefore, since an increase in the intruding volume of the cup seal 35 can be controlled while relieving a stress concentration therein, the cup seal 35 can be prevented from being damaged.

It is to be noted that, in this case, in addition to the secondary side sealing structure SS, the primary side sealing structure SP also has a similar structure, so that the similar effect can be expected on the latter.

According to an aspect of the present invention, since the chamfered portion having a curved shape in a cross section and formed between the annular wall behind the cup seal and the cylinder wall to which a piston is facing is configured such that one end portion of the chamfered portion is formed continuously so that a tangent thereof may be in line with the annular wall, while the other end portion of the chamfered portion is formed so as to constitute a flexed portion in combination with the cylinder wall, consequently a radius of curvature of the curve can be increased without accompanying an increase in an intruding volume of the deformed portion of the cup seal. Therefore, since an increase in the intruding volume of the cup seal can be controlled while relieving a stress concentration therein, the cup seal can be prevented from being damaged.

Further, the chamfered portion may be formed into a shape of an elliptic arc in a cross section taken along a diameter direction of the cylinder main body. In this case also, a radius of curvature of the curve can be increased without accompanying an increase in an intruding volume of the deformed portion.

Further, the chamfered portion may be formed into a shape of a circular arc in a cross section taken along a diameter direction of the cylinder main body. In this case, a radius of curvature is kept to be constant, and the stress concentration may be relieved furthermore.

Further, preferably a radius of curvature of the chamfered portion may be set to be three times as large as a clearance between the piston and the cylinder wall. In this case, the increase in the intruding volume of the cup seal can be surely controlled while relieving the stress concentration therein.

Further, according to another aspect of the present invention, the center of the circular arc shape of the chamfered portion formed between the annular wall behind the cup seal and the cylinder wall to which the piston is facing is shifted to the cylinder wall side as compared to the case where the tangents to both ends of the chamfered portion are in line with the annular wall and the cylinder wall, respectively. In this case, the radius of curvature of the arc can be increased without accompanying an increase in the intruding volume of the deformed portion. Therefore, since the increase in the intruding volume of the cup seal can be controlled while relieving the stress concentration therein, the cup seal can be prevented from being damaged.

Preferably, the shifting amount of the center of the circular arc of the chamfered portion may be smaller than a clearance between the piston and the cylinder wall. In this case, the distance to the annular wall from a position of the flexed portion which is constituted by the chamfered portion and the cylinder wall can be secured. Therefore, the flexed portion can be prevented from contacting with the cup seal to generate the stress concentration therein.

Further, according to another aspect of the present invention, a process of forming a chamfered portion on an annular wall located behind the cup seal at an end portion thereof defined in an inner circumference side when machining a seal groove on the cylinder main body, into which the cup seal is to be fitted, wherein the chamfered portion is formed such that a shape of the chamfered portion is formed into a curved shape in a cross-section taken along a diameter direction of the cylinder main body so that a tangent to one end of the chamfered portion is in line with the annular wall, and a following process of forming a flexed portion in the chamfered portion at an end portion thereof defined in the cylinder wall side by applying a smoothing processing onto the cylinder wall facing the piston are included. Therefore, the chamfered portion having a curved cross-section and provided between the annular wall and the cylinder wall can be easily formed such that the tangent of one end portion may be in line with the annular wall and the other end portion may constitute the flexed portion in combination with the cylinder wall.

Although only some exemplary embodiments of the present invention have been described in detail above, those skilled in the art will readily appreciate that many modifications are possible in the exemplary embodiments without materially departing from the novel teaching and advantages of the present invention. Accordingly, all such modifications are intended to be included within the scope of the present invention.

The present application claims priority under 35 U.S.C. section 119 to Japanese Patent Application No. 2007-120,279, filed on Apr. 27, 2007. The entire disclosure of Japanese Patent Application No. 2007-120,279 including specification, claims, drawings and summary is incorporated herein by reference in its entirety.

The entire disclosure of the Japanese Laid Open Publication No. 2006-123,879 including specification, claims, drawings and summary is incorporated herein by reference in its entirety.

What is claimed is:

1. A master cylinder in which a piston is moved in slidable contact with an inner circumference of a cup seal held in the cylinder main body so as to pressurize a brake fluid in a pressure chamber formed of said piston and said cylinder main body, said master cylinder comprising:
    an annular wall constituted integrally with said cylinder main body behind said cup seal; and
    a chamfered portion provided between said annular wall and a cylinder wall to which said piston is facing, said chamfered portion having a curved shape in a cross-section taken along a diameter direction of said cylinder main body, wherein
    a tangent to one end of said chamfered portion is formed continuously so as to be in line with said annular wall, and the other end of said chamfered portion is formed so as to constitute a flexed portion in combination with said cylinder wall.

2. The master cylinder of claim 1, wherein said chamfered portion is formed into an elliptic arc shape in a cross-section taken along the diameter direction of said cylinder main body.

3. The master cylinder of claim 1, wherein said chamfered portion is formed into a circular arc shape in a cross-section taken along the diameter direction of said cylinder main body.

4. The master cylinder of claim 3, wherein a radius of curvature of said chamfered portion is approximately three times as large as a clearance between said piston and said cylinder wall.

5. A master cylinder in which a piston is moved in slidable contact with an inner circumference of a cup seal held in the cylinder main body so as to pressurize a brake fluid in a pressure chamber formed of said piston and said cylinder main body, said master cylinder comprising:
    an annular wall constituted integrally with said cylinder main body behind said cup seal; and
    a chamfered portion provided between said annular wall and a cylinder wall to which said piston is facing, said chamfered portion having a circular arc shape, wherein
    a center of a circular arc of said chamfered portion is shifted toward said cylinder wall from a center of a circular arc defined in a case where tangents to both ends of said chamfered portion are in line with said annular wall and said cylinder wall.

6. The master cylinder of claim 5, wherein a shifting amount of said center of the circular arc of said chamfered portion is smaller than a clearance between said piston and said cylinder wall.

7. A method for manufacturing a master cylinder in which a piston is moved in slidable contact with an inner circumference of a cup seal held in the cylinder main body so as to pressurize a brake fluid in a pressure chamber formed of said piston and said cylinder main body, said method comprising the steps of:
    forming a chamfered portion on an annular wall located behind said cup seal at an end portion thereof defined in an inner circumference side when machining a seal groove on the cylinder main body, into which said cup seal is to be fitted, wherein said chamfered portion is formed such that a shape of said chamfered portion is formed into a curved shape in a cross-section taken along a diameter direction of said cylinder main body so that a tangent to one end of said chamfered portion is in line with said annular wall; and then
    forming a flexed portion in said chamfered portion at an end portion thereof defined in said cylinder wall side by applying a smoothing processing onto said cylinder wall facing to said piston.

8. The method for manufacturing a master cylinder of claim 7, wherein said chamfered portion is formed into a circular arc shape in a cross-section taken along a diameter direction of said cylinder main body.

9. The method for manufacturing a master cylinder of claim 8, wherein a radius of curvature of said chamfered portion is set to be approximately three times as large as a clearance between said piston and said cylinder wall.

* * * * *